United States Patent [19]
Koveal et al.

[11] Patent Number: 5,948,378
[45] Date of Patent: Sep. 7, 1999

[54] REMOVAL OF AMMONIA AND CYANIDE FROM SYNTHESIS GAS WITH WATER PRODUCTION

[75] Inventors: Russell J. Koveal, Baton Rouge, La.; Dennis G. Alexion, Succasunna, N.J.

[73] Assignee: Exxon Research and Engineering Co., Florham Park, N.J.

[21] Appl. No.: 09/016,182

[22] Filed: Jan. 30, 1998

[51] Int. Cl.$^6$ ................................ C01C 3/00; C07C 1/02
[52] U.S. Cl. ............................. 423/236; 252/373
[58] Field of Search ............................. 252/373; 423/236

[56] References Cited

U.S. PATENT DOCUMENTS

| | | | |
|---|---|---|---|
| 4,189,307 | 2/1980 | Marion | 48/197 |
| 4,769,224 | 9/1988 | van Grinsven et al. | 423/236 |
| 5,068,254 | 11/1991 | Posthuma et al. | 518/705 |
| 5,260,239 | 11/1993 | Hsia | 502/30 |
| 5,283,216 | 2/1994 | Mitchell | 502/30 |

FOREIGN PATENT DOCUMENTS

| | | | |
|---|---|---|---|
| 661374 A1 | 12/1993 | European Pat. Off. | |
| 0661372 | 7/1995 | European Pat. Off. | C10K 1/10 |
| 0661375 | 7/1995 | European Pat. Off. | C10K 1/34 |

*Primary Examiner*—Paul J. Killos
*Assistant Examiner*—J. Parsa
*Attorney, Agent, or Firm*—Jay Simon

[57] ABSTRACT

A process for producing and cleaning a synthesis gas which contains ammonia and hydrogen cyanide catalytically converts most of the cyanide to ammonia which, along with some of the cyanide, is removed from the gas with water to form aqueous solutions of ammonia and cyanide. The hydrocarbon gas feed to the synthesis gas generator is used to strip ammonia and cyanide out of one or more of the aqueous solutions of these two species formed during the process and pass them into the generator in which they are consumed to form clean water. A portion of the resulting clean water is recycled back into the process where it used to scrub the synthesis gas, with the remainder used for other purposes or sent to disposal.

18 Claims, 2 Drawing Sheets

REMOVAL OF AMMONIA AND CYANIDE FROM SYNTHESIS GAS WITH WATER PRODUCTION

BACKGROUND OF THE DISCLOSURE

1. Field of the Invention

The invention relates to an environmentally friendly process for removing cyanide and ammonia from synthesis gas. More particularly, the invention relates to the production and cleanup of synthesis gas, in which hydrogen cyanide is converted to ammonia which is removed from the gas with water, and then using the hydrocarbon gas feed to strip it out of the water and into the equilibrium controlled synthesis gas generator to produce clean water and dispose of the ammonia and remaining cyanide. The clean water may then be used for any purpose or disposed of, and the clean synthesis gas may then be used for hydrocarbon or chemicals synthesis.

2. Background of the Invention

Hydrocarbon synthesis (HCS) processes are well known and include fixed bed, fluid bed and slurry type processes in which a synthesis gas (syngas) comprising a mixture of $H_2$ and CO is reacted in the presence of a suitable Fischer-Tropsch type of hydrocarbon synthesis catalyst at conditions effective to form hydrocarbons, and preferably $C_{5+}$ hydrocarbons which are solid at standard room temperature conditions of temperature and pressure. Syngas may also be used for making methanol and higher alcohols, aldehydes, acetic acid, dimethyl ether and other chemicals. The syngas is produced by reacting a low molecular weight hydrocarbon gas with oxygen and steam, via well known processes which include partial oxidation with or without a catalyst, catalytic steam reforming and combination thereof, using a fixed or fluid catalyst bed. Syngas made from hydrocarbon gas which contains nitrogen (i.e., natural gas) or nitrogen containing compounds (i.e., the hydrocarbon gas is derived from a resid, coal, shale, coke, tar sands, etc.) invariably contains nitrogen species (e.g., HCN and $NH_3$ which deactivate the HCS catalyst. Consequently, the concentration of the ammonia and cyanide in the gas must be reduced to very low levels to achieve catalyst life and concomitant productivity of the hydrocarbon synthesis reactor. U.S. Pat. Nos. 4,189,307; 4,769,224; 5,068,254 and European patent publications EP 0 661 372 A and EP 0 661 375 A disclose methods for removing ammonia and hydrogen cyanide from syngas, including recycle of ammonia containing gas and water back into the syngas generator.

SUMMARY OF THE INVENTION

The invention relates to a process for producing and cleaning a synthesis gas which contains ammonia and hydrogen cyanide in which most of the cyanide is catalytically converted to ammonia which, along with some of the cyanide, is removed from the gas with water to form aqueous solutions of ammonia and cyanide. The hydrocarbon gas feed to the synthesis gas generator is used to strip ammonia and cyanide out of one or more of the aqueous solutions of these two species formed during the process and pass them into the generator in which they are consumed to form clean water. A portion of the resulting clean water is recycled back into the process where it used to scrub the synthesis gas, with the remainder used for other purposes or sent to disposal. Thus, in a broad sense the invention relates to a process which comprises producing a synthesis gas comprising $H_2$, CO, ammonia and hydrogen cyanide in a synthesis gas generator from a feed comprising a hydrocarbon gas, catalytically converting most of said hydrogen cyanide to ammonia, dissolving said ammonia and a portion of said hydrogen cyanide remaining in said synthesis gas after said conversion, in water and stripping said ammonia and hydrogen cyanide out of said water and into said generator with said hydrocarbon feed gas to produce clean water, wherein said ammonia and hydrogen cyanide are consumed in said generator. During the process, the synthesis gas is contacted with water both before and after conversion of the hydrogen cyanide to ammonia, to form more than one aqueous solution of ammonia and hydrogen cyanide. Following conversion of the hydrogen cyanide to ammonia, the synthesis gas is cooled to condense out water vapor and, with it some of the ammonia and remaining cyanide as an aqueous solution of these species, with the ammonia and cyanide reduced gas then scrubbed with the clean water produced in the process to remove more ammonia and cyanide and form an aqueous solution of these species, which are then stripped out with the hydrocarbon gas feed to the synthesis gas generator. Following this final scrubbing, the synthesis gas may then be passed through a guard bed of an absorbent or adsorbent effective for removal of ammonia and hydrogen cyanide, such as activated carbon or alumina and also through a guard bed containing an absorbent effective for sulfur removal, such as zinc oxide. Ammonia and cyanide stripped out of the water with the hydrocarbon feed gas for the generation of the synthesis gas are consumed in the equilibrium controlled syngas generator (reactor). The stripping also humidifies the hydrocarbon gas feed for the generator. Catalytic conversion of the hydrogen cyanide to ammonia may be accomplished by hydrolysis or by hydrogenation, with hydrolysis being preferred. Conversion of the cyanide to ammonia is preferred, because of the high solubility of ammonia in water, which provides substantially quantitative ammonia removal. The ammonia removal is therefore simple and effective. A preferred catalytic hydrolysis process is disclosed in copending U.S. patent application Ser. No. 08/797,368 filed on Feb. 2, 1997 due to its ability to convert substantially all of the hydrogen cyanide to ammonia. After removal of the ammonia and hydrogen cyanide, the syngas may then be used for hydrocarbon production, for making methanol and higher alcohols, aldehydes, acetic acid, dimethyl ether and other chemicals and any other process which requires low levels of ammonia and hydrogen cyanide. It is preferred that the sulfur content of the gas be less than 1 vppm of sulfur, more preferably less than 0.1 vppm and still more preferably less than 50 vppb. The concentration of the combined total of hydrogen cyanide and ammonia present in the syngas is preferably reduced to less than 0.1 vppm, more preferably less than 50 vppb and still more preferably less than 20 vppb. Further, in the process of the invention, most of the sulfur will have been removed from the hydrocarbon gas feed for the synthesis gas generation before it is used to strip out the ammonia and hydrogen cyanide from the one or more aqueous solutions of these two species formed during the process. The sulfur concentration in this gas will preferably be no greater than 0.1 vppm and more preferably no greater than 50 vppb.

DETAILED DESCRIPTION

Figure 1:
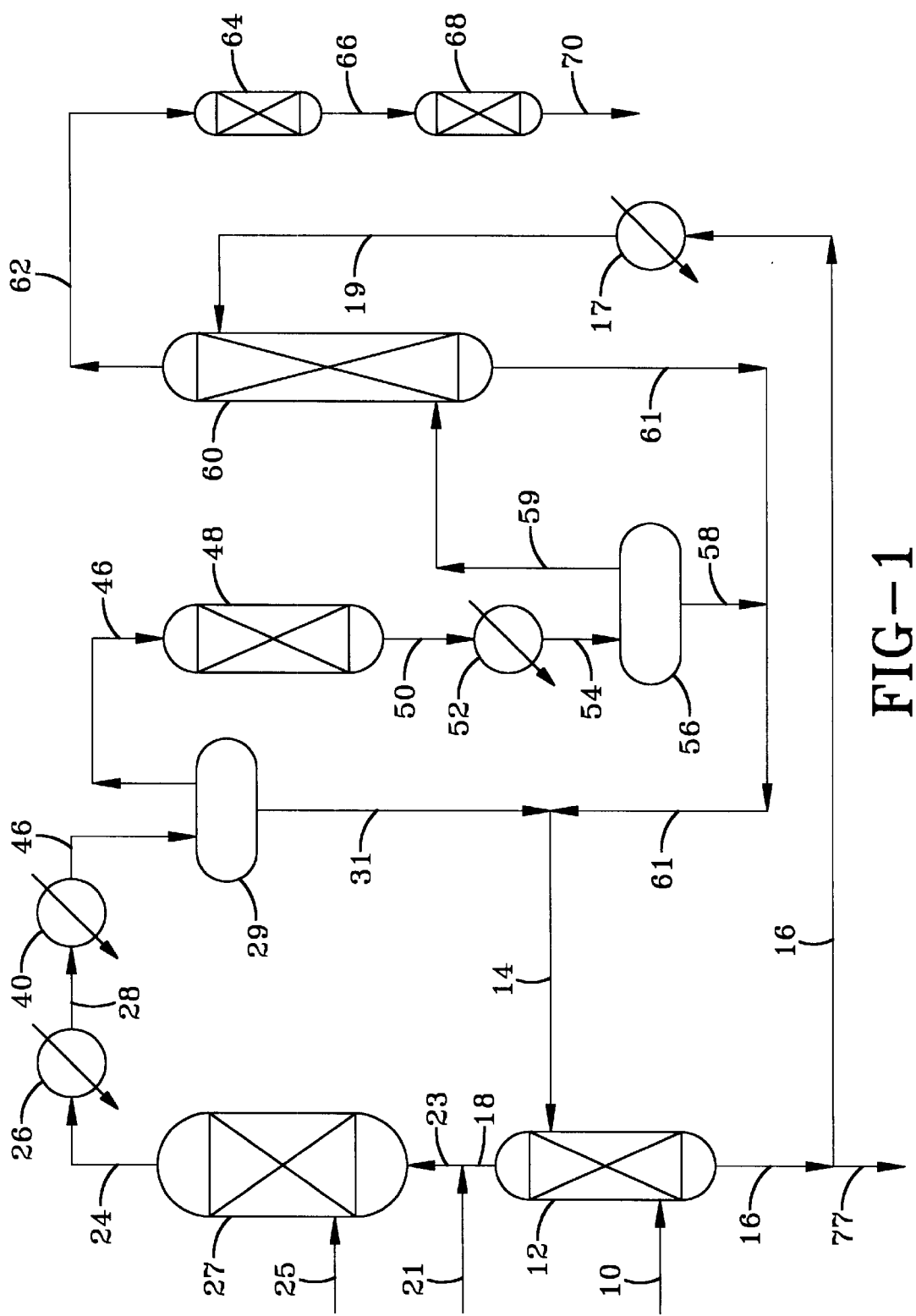
FIG. 1 is a schematic flow diagram of a process of the invention useful with syngas generating processes which do not result in particulate entrainment in the gas.

In the process of the invention, the syngas which comprises a mixture of $H_2$ and CO is formed from a hydrocarbonaceous gas feed. While the hydrocarbon gas feed for the syngas generator is conveniently derived from natural gas which comprises mostly methane, it may be obtained by any available and convenient means from any suitable hydrocarbonaceous material. Typically an HCS plant will be proximate a source of such hydrocarbonaceous materials and the syngas generating operation will be an integral part of the HCS plant. Feeds comprising a low molecular weight (e.g., $C_1-C_4$) hydrocarbon gas, preferably alkane and more preferably mostly methane, as in natural gas are preferred. Natural gas is particularly preferred because it comprises primarily methane, is convenient, clean and doesn't leave large quantities of ash, shale, sulfur compounds and the like to be handled and disposed of. Irrespective of either the source of the hydrocarbon gas for the syngas production or the process, such hydrocarbon feeds invariably contain elemental nitrogen or nitrogen containing compounds which react in the syngas generator to form nitrogenous species, such as HCN and $NH_3$, which deactivate the HCS catalyst during the HCS reaction. After sulfur and, if necessary, $CO_2$ removal, the natural gas is fed into a syngas generator in which the hydrocarbon component of the gas is reacted with oxygen or air and, optionally steam, to form the syngas comprising a mixture of $H_2$ and CO in the desired mole ratio. As is known, syngas may be formed by non-catalytic and catalytic partial oxidation, steam reforming and combination of partial oxidation and reforming. In catalytic partial oxidation, a premixed feed of hydrocarbon gas, oxygen, and optionally steam or water vapor, is reacted in the presence of a noble metal catalyst and preferably a supported noble metal catalyst in the syngas generator to form the syngas, as is known. Processes that combine partial oxidation and steam reforming may have the steam reforming catalyst in either a fixed or fluid bed, with a fluid bed having superior mixing and heat transfer characteristics. In a fluid bed syngas generating (FBSG) process, the partial oxidation and steam reforming both occur in the presence of the fluidized steam reforming catalyst. FBSG is disclosed, for example, in U.S. Pat. Nos. 4,888,131 and 5,160,456. In autothermal reforming, partial oxidation occurs in the absence of a catalyst and precedes adiabatic steam reforming which occurs in a fixed bed of catalyst. The syngas exiting the reactor comprises a mixture of $H_2$ and CO along with water vapor or steam, nitrogen, $CO_2$, minor amounts of unreacted methane, $NH_3$ and HCN. The amount of $CO_2$ present in the feed to the syngas generator will effect the reaction equilibrium and may be used, along with the conditions in the unit, to adjust the $H_2$ to CO ratio of the syngas. Most of the water is removed from the syngas before it is passed into an HCS reactor. The syngas generator reactor is equilibrium controlled with respect to the amount of HCN and $NH_3$ present in the generator or reactor, which can be illustrated by the following reactions:

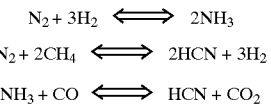

Therefore, disposal of the HCN and NH3 catalyst deactivating species occurs when these compounds are fed into the equilibrium controlled syngas generator, by shifting the reactions back towards nitrogen.

The syngas generating unit may be a fixed or fluid bed syngas generator or both and may comprise more than one vessel as is known to those skilled in the art. It may also comprise a catalytic or non-catalytic partial oxidation unit. However, in this specific embodiment, FIG. 1 illustrates a schematic flow process of the invention useful with a syngas generating process which does not result in particulate entrainment in the syngas, such as catalytic partial oxidation or autothermal reforming. Referring to FIG. 1, a preheated natural gas processed by amine treating and absorption to remove sulfur and $CO_2$, substantially sulfur-free (e.g., <0.1 vppm), containing about 4% nitrogen and comprising at least 90% methane is passed via line 10 into the bottom of a gas-liquid contacting tower indicated as vessel 12, in which it is contacted with water entering near the top of the tower via line 14. Tower 12 is filled with inert packing material such as rashig rings, berl saddles, structured packing and the like or contains a plurality of trays to insure sufficient contact for the gas to contain enough water vapor for the syngas generation downstream. The contacting is typically sufficient to saturate the gas with water vapor. The water entering the tower comprises an aqueous solution of ammonia and hydrogen cyanide explained in detail below. The ammonia and hydrogen cyanide are stripped from the downflowing water by the upflowing natural gas stream and passed into the syngas generator with the gas, in which they are destroyed by the heat and equilibrium controlled conditions in the generator and thereby effectively disposed of. At least 95%, preferably at least 98% and more preferably at least 99% of the ammonia and any remaining hydrogen cyanide are stripped out of the water to produce clean water. This water will typically contain less than 100 mg/L of ammonia and less than 1 mg/L (e.g., 0–<1 mg/L) of hydrogen cyanide. Optionally, a reboiler (not shown) located either in the bottom of tower 12 or external of it, as is known to those skilled in the art, may be used to heat a portion of the clean water to produce steam, if required to insure the desired degree of humidification of the hydrocarbon feed stripping gas. This steam will pass up through the tower with the hydrocarbon feed gas. The resulting clean water, stripped of ammonia, hydrogen cyanide and other water soluble compounds, passes out the bottom of the vessel via line 16 and into heat exchanger 17 in which it is cooled and passes into scrubber 60 via line 19 in which it is contacted with the hydrolyzed syngas from which most of the ammonia and hydrogen cyanide have been removed, as a polishing or finishing step to remove any remaining in the gas down to a level of less than 100 vppb, preferably less than 50 vppb and more preferably less than 10 vppb. Some of this clean water is removed via line 77 to prevent water build-up in the process. This clean water may be used for any purpose or sent to disposal. The water saturated natural gas is removed, via line 18, from the humidifier-stripper 12, is mixed with oxygen entering via line 21, and the mixture then passed into a syngas generating unit 27 via line 23. In this particular embodiment, the syngas generating unit is a catalytic partial oxidation unit in which the catalyst comprises one or more of the noble metals referred to above supported on a ceramic foam able to withstand the high temperature in the unit. As is known, the mixture of methane, oxygen and water vapor react in the presence of the catalyst to form the syngas containing a mixture of $H_2$ and CO, along with water vapor, nitrogen, unreacted methane, ammonia in an amount of from about 100 to 1,000 vppm and hydrogen cyanide in an amount of from about 1 to 10 vppm. Optionally, additional water vapor or steam may be introduced into the syngas generator via line 25, as a temperature moderator or reactant.

If autothermal reforming is used instead of the catalytic partial oxidation, oxygen will not be premixed with the humidified hydrocarbon. Instead, the humidified hydrocarbon and oxygen are injected into a partial oxidation zone (not shown) in reactor vessel 27, in which the hydrocarbon is partially oxidized, followed by steam reforming in the presence of a fixed bed of steam reforming catalyst referred to above in a separate steam reforming zone downstream of the partial oxidation zone. As is the case for catalytic partial oxidation, additional water vapor may optionally be passed into the autothermal syngas generator via line 25 to moderate the temperature in the unit or as a reactant, as is known to those skilled in the art. The concentration of the ammonia and hydrogen cyanide in the syngas generator is controlled (limited) by the equilibrium conditions in the generator. This thereby effectively disposes of the ammonia and hydrogen cyanide passed into the generator with the hydrocarbon gas. Due to the high temperature in the syngas generator, the syngas exiting the unit via line 24 and comprising a mixture of $H_2$ and CO is optionally passed through a heat exchanger 26 (or through a turbine for generating electricity), which could be a steam generator, which cools it from about 1900° F. down a temperature of about 600– 1,000° F. at a pressure of about 400 psig and then passed, via line 28, through heat exchanger 40 which cools it down to about 300–600° F. This results in condensation of some of the water vapor from the gas as an aqueous solution containing a minor amount of ammonia and hydrogen cyanide (e.g., typically less than 10% of the hydrogen cyanide and ammonia present in the syngas produced in the generator), with the mixture of syngas and aqueous solution passed, via line 46 into a gas-liquid separator 29 which, in this case, may be a simple knock-out drum. This is done to lower the gas temperature down to an acceptable level for the subsequent hydrolysis and also removes excess the water from the gas down to a level acceptable for the hydrolysis (e.g., $\leq 30$ volume %). Depending on the temperature of the syngas exiting 26, heat exchanger 40 may heat the gas to achieve a temperature in the range of from about 300–600° F. The aqueous solution is withdrawn from vessel 29 and passed, via lines 31 and 14, back into the hydrocarbon gas humidifier-stripper 12. The cool gas is then passed into a hydrolysis reactor 48 via line 46. This reactor contains a hydrolysis zone which comprises a fixed bed of catalyst for hydrolyzing the hydrogen cyanide to ammonia. While a number of known catalysts may be employed for the hydrolysis, in one embodiment it is preferred that the hydrolysis catalyst comprise an oxide of at least one metal selected from the group consisting essentially of a Group VI metal, a Group IVB metal and mixture thereof and particularly an oxide of Al and at least one of Mo and Ti, as is disclosed in European patent publication EP 0 757 969 A. This catalyst will comprise a composite oxide of from about >0 to 30 wt. % Mo as the oxide, preferably 10 to 20 wt. %, with the titania present in an amount of about >0 to 30 wt. %, preferably 4 to 20 wt. %, more preferably 8–16 wt. % (e.g., 8 wt. %), with the remainder being alumina. The catalyst may be readily prepared by depositing suitable sources of molybdenum and titanium on an alumina support and after deposition by, for example, impregnation or incipient wetness techniques, the composite is dried and then calcined at temperatures of from about 250–500° C., and preferably 350–450° C. to produce the oxide form. It is preferred that this catalyst be treated with hydrogen at a temperature of from about 200–600° C., preferably 230–550° C. for from 1–24 hours. The alumina may be any alumina useful as a catalyst support and typically one having a surface area of between about 100–400 $m^2/g$. The amount of HCN to be hydrolyzed and removed from the synthesis gas is typically very small (e.g., <5000 vppb). Water typically present in an amount of from about 5–25 volume % results from the syngas generation, although the actual amount of water present may be greater or lower, and this amount of water is more than sufficient to hydrolyze the relatively minor amount of HCN present in the syngas. During the hydrolysis reaction, the HCN reacts with water and is converted to $NH_3$ and CO. At least about 95%, typically at least 98% and even more than 99% of the HCN is converted to $NH_3$. Syngas produced from natural gas comprising about 96% methane and 4% nitrogen will typically have an equilibrium limited amount of hydrogen cyanide and ammonia of about 5 ppm and 300 ppm, respectively, and in the embodiment of this example, except for the minor amount removed by cooling in 40 and separating the resulting aqueous ammonia and cyanide solution in 29 and feeding it back into the humidifier 12 and then the syngas generator, this is the amount present in the syngas fed into the catalytic hydrolysis zone 48. The temperature, pressure and space velocity in the HCN hydrolysis zone 48 may broadly range from about 100–400° C., 1–100 atm and 2000–50000 GHSV. The hydrolysis temperature is chosen so as to achieve a hydrolysis rate sufficient to achieve at least 95%, preferably at least 98% and still more preferably at least 99% conversion of the hydrogen cyanide to ammonia in the hydrolysis reactor, depending on the level of the cyanide in the gas and the hydrolysis temperature in the reactor, while avoiding undesirable side reactions such as methanation of the CO present in the syngas. The hydrolyzed syngas passes out of the reactor 48 via line 50, and then through a heat exchanger 52, in which it is cooled to about 120° F. which condenses out most of the water vapor in the gas and with it, the $NH_3$. The water resulting from this condensation comprises an aqueous ammonia solution which contains most (e.g., ~90%) of the $NH_3$ that was present, leaving very little left in the gas. In one experiment, syngas containing on a volume % basis, 43% $H_2$, 21.2% CO, 7% $CO_2$, 8.6% $N_2$, 5.4% $CH_4$, 15% $H_2O$, 340 vppm $NH_3$ and 6.4 vppm HCN was passed through the hydrolysis zone at 205° C., 26.4 atm., and 12000 hr-1 space velocity, in which it contacted a cyanide hydrolysis catalyst which comprised an alumina and titania support material which was impregnated with ammonium heptamolybdate and calcined as outlined above. The concentration of the hydrogen cyanide in the syngas exiting the reactor was less than 20 vppb which represented more than 99% removal. A repeat of this experiment using more sensitive analytical procedures revealed it to be less than 10 vppb. The hydrolysis reactor was operated for 127 days with no measurable decrease in cyanide removal activity. In another experiment, identical to the experiment above, but wherein the temperature in the hydrolysis reactor was at 165° C., the concentration of cyanide in the exiting syngas was 269 vppb, indicating 95.8% of the cyanide was converted to ammonia. After hydrolysis and water scrubbing the syngas will be passed through one or more beds containing ammonia and hydrogen cyanide adsorbents or absorbents, if for no other reason than to guard the downstream HCS reactor from break throughs in HCN and $NH_3$ concentration in the syngas. While catalytic hydrolysis of the HCN to $NH_3$ is a preferred embodiment, catalytic hydrogenation of the HCN to $NH_3$ may also be employed as is disclosed, for example, in European patent publication EP 0 767 137 A and UK patent application GB 2 267 048 A.

The gas and ammonia water mixture formed in heat exchanger 52 is passed, via line 54, into another gas-liquid separator 56 in which the aqueous ammonia solution is separated from the gas and passed, via lines 58, 61 and 14 back into humidifying-stripping vessel 12 which strips the ammonia and any hydrogen cyanide out of the water and passes them back into the syngas generator in which they are consumed. The advantage of converting hydrogen cyanide into ammonia is that ammonia is highly water soluble, whereas hydrogen cyanide is not soluble enough to remove it from the gas down to the desired levels. In fact, quantitative removal of ammonia by water washing is easily achieved. Depending on the water temperature and the wash rate, only about 25 % of the residual hydrogen cyanide dissolves in the water. With the natural gas feed to the syngas generator and the hydrolysis catalyst and conditions described above, the amount of hydrogen cyanide remaining in the syngas after hydrolysis is <20 vppb. The syngas is passed from the separator 56, via line 59, into a scrubber 60, which is a gas-liquid contacting tower such as a cap and tray column, a packed tower containing high surface area packing such as rashig rings, and the like. Wash water, which is the clean water recovered from vessel 12 via line 16 and then cooled to a temperature of about 50° C. in heat exchanger 17 for more efficient ammonia removal, enters the top of the scrubber via line 19 and flows down thereby contacting the upward flowing syngas and dissolving substantially all of the ammonia in the gas to produce a scrubbed syngas having an ammonia content of less than 20 vppb and preferably less than 10 vppb, and a hydrogen cyanide content of about 10 vppb. While separation drum 56 and scrubber 60 are shown as separate vessels, if desired they may be combined into one vessel, with the bottom portion of the vessel comprising the gas-liquid separating zone and the water streams resulting from both separations combined. While in this example the scrubber operates at 50° C., it may be operated at a temperature of from about 25–120° C. The effluent water containing the residual ammonia and substantially no hydrogen cyanide (e.g., 0–1 wppm) is removed from the scrubber via line 61 and passed via lines 61 and 14 back into the humidifier-stripper 12 and from there into the syngas generator. The scrubbed syngas leaves the scrubber via line 60 and is passed into an adsorption zone indicated by vessel 64, in which it contacts one or more solid adsorbents which are selective for adsorption of HCN in the presence of CO, $CO_2$, $H_2$ and $H_2O$, illustrative, but nonlimiting examples of which include zeolite molecular sieves, activated carbon, ZnO, alumina and the like, with activated alumina and activated carbon being preferred. The adsorption of the residual HCN and $NH_3$ is carried out at temperatures of from 25 to 120° C., pressures of from 1 to 100 atm and space velocities of from about 2000 to 20000 scf/hr. The syngas resulting from this adsorption step will contain less than 20 and preferably less than 10 vppb of the combined total amount of ammonia and hydrogen cyanide. The gas exits 64 and then passes through a sulfur absorber 68 which contains a suitable sulfur absorbent such as zinc oxide which removes sulfur compounds from the gas down to a level of less than 50 vppb and more preferably less than 10 vppb. This produces a clean syngas which exits the absorber via line 70 and which may then be used for Fischer-Tropsch hydrocarbon synthesis, for synthesizing methanol and higher alcohols, aldehydes, acetic acid, dimethyl ether and other chemicals, with little catalyst deactivation.

Figure 2:
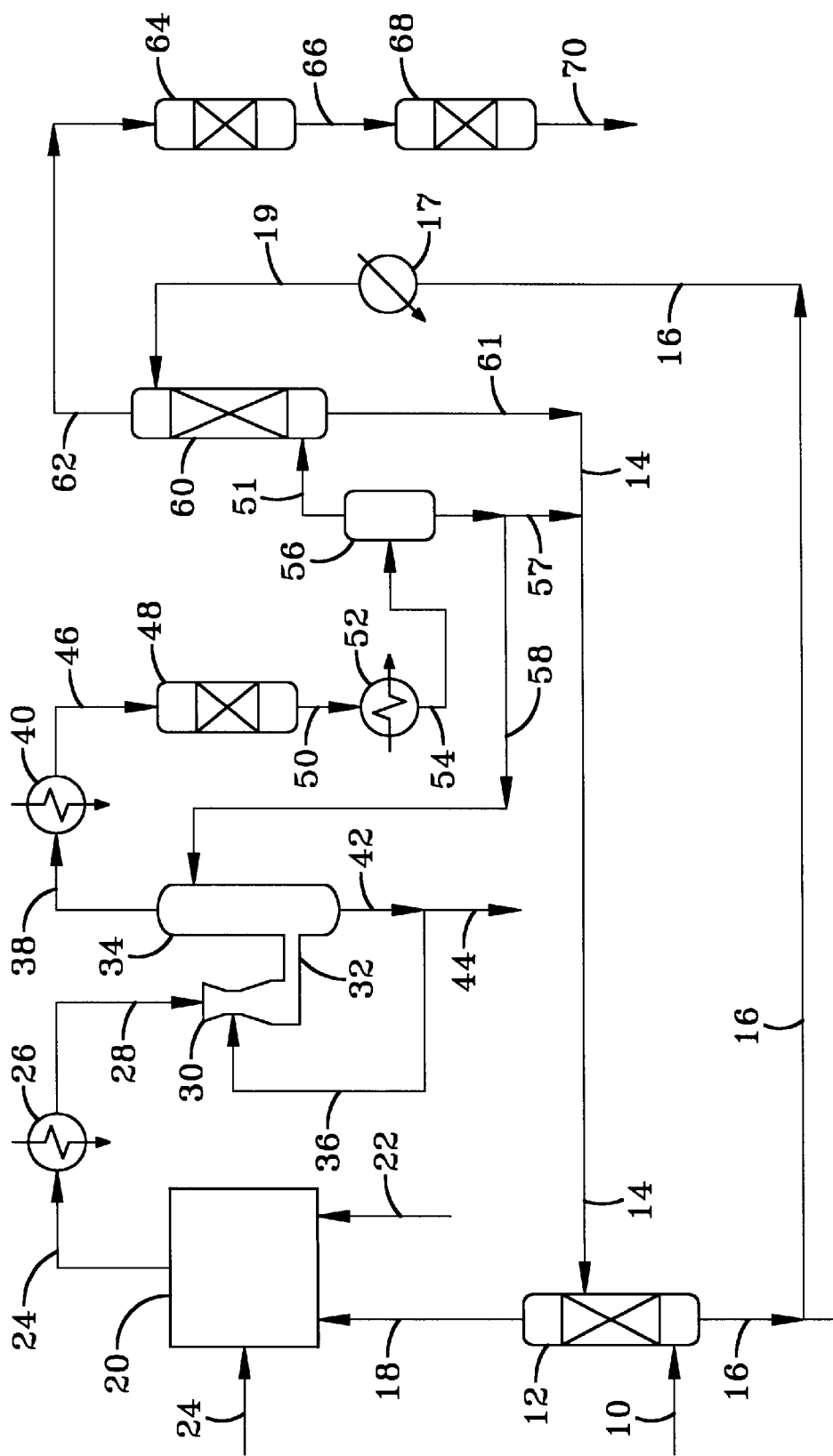
FIG. 2 is a schematic flow diagram of a process of the invention useful for syngas generating processes which results in particulate entrainment in the gas.

FIG. 2 is a schematic flow diagram of a process of the invention in which the syngas produced in the syngas generator contains entrained particulate solids. In this embodiment, the syngas generator is an FBSG in which both the partial oxidation and the steam reforming occur in the presence of the fluidized reforming catalyst, such as a supported nickel catalyst. Further, in this embodiment the fluidized catalyst bed contains substantially inert, attrition resistant, solid, heat transfer particles such as alpha alumina which minimize catalyst particle agglomeration and permit the FBSG to operate at higher temperatures as is known and disclosed in, for example, U.S. Pat. No. 5,160,456. In FIG. 2, numbers identical to those in FIG. 1 refer to the same units and operations. Referring to FIG. 2, the processed natural gas feed referred to above comprising 94% methane and 4% nitrogen is passed up through humidifier-stripper 12 in which it becomes humidified by contact with water containing $NH_3$ and HCN in solution which enters the top of the tower via line 14 and strips these catalyst deactivating species out of the water and, via line 18, into FBSG 20 in which they are consumed and effectively disposed of by the equilibrium controlling conditions in the generator. If necessary, additional water vapor or steam is fed into the FBSG via line 22 and oxygen or an oxygen containing gas is fed into the FBSG via line 24. The resulting clean water is removed from 12 and passed back into scrubbing tower 60 via line 16, cooler 17 and line 19 for ammonia and hydrogen cyanide removal from the syngas, as is the case for the process of FIG. 1. In the FBSG the hydrocarbons in the natural gas, which comprises mostly methane, and typically along with minor amounts of $C_2$–$C_8$ hydrocarbons, are partially oxidized and catalytically steam reformed to produce a syngas comprising a mixture of $H_2$ and CO, along with minor amounts of ammonia and hydrogen cyanide. Due to the high temperature in the syngas generator, the syngas exiting the unit via line 24 is optionally passed through a heat exchanger (or through a turbine for generating electricity), which could be a steam generator, which cools it to a temperature of 500–1000° F., and then into a high energy gas-water contacting means which, in this illustration is venturi scrubber 30, via line 28. This results in cooling the gas down to a temperature of from about 300–400° F. and reduces the pressure down to about 25 atmospheres. Venturi scrubbers are well known and need not be explained. Other types of high energy contacting means include cyclone scrubbers, impingement plate scrubbers, mechanical scrubbers such as a Roto-Clone (American Air Filter Co.), and the like. The syngas contains small amounts of particulate matter entrained from the FBSG (e.g., catalyst and heat transfer solids fines), most of which is removed by primary and secondary cyclones (not shown) as it exits the syngas generator. As the gas passes down through the venturi scrubber, it is contacted with water entering the venturi via line 36, which cools the gas and removes remaining particulate matter. The scrubbed gas and the water which contains the particulate matter, are passed into a separator-demister 34, via conduit 32, in which the fines containing water is separated from the gas. The demister section (not shown) is located in the upper portion of the unit and contains crinkled wire, wire mesh, loose packing and the like to dentrain, coalesce and separate particulate-containing mist formed in the venturi scrubber. Ammoniated water withdrawn from separator 56 via line 58 enters the top of 34 and flows down through the demisting means therein wherein it contacts the coalescing mist and upflowing gas to ensure that the gas is particle-free prior to leaving the separator-demister. Optionally, all or a portion of the water entering the top of 34 may come from the syngas solution which leaves scrubber 60 via line 61 and which contains very little dissolved ammonia and hydrogen cyanide. The particulate free, cooled and demisted syngas is removed from the separator-demister via line 38 and passed into another heat exchanger 40 in which it is cooled or heated to about 400° F. for the subsequent catalytic hydrolysis step. The water phase is withdrawn from the demister-separator via line 42 and a portion recycled back into the venturi scrubber via line 36, with the remainder sent via line 44 to disposal. Optionally, a portion of the water passed into the venturi scrubber may comprise either or both the ammoniated water produced in 56 or the syngas solution withdrawn from scrubber 60. A difference between this embodiment and the one illustrated in FIG. 1 resides in some of the ammonia and hydrogen cyanide being disposed of via line 44, instead of being combined with the other streams recycled back into 12. This is because of the particulate matter present in stream 44. If desired, the particulate matter may be removed from the aqueous solution of ammonia and hydrogen cyanide comprising stream 44 by any suitable separation means, such as filtration, with the filtrate passed into 12. The cool gas exiting the heat exchanger is passed into the hydrolysis reactor 48 via line 46 and from there sequentially through heat exchanger 52, line 54, separator 56, line 51 and tower 60, as is the case for the embodiment described above for FIG. 1. The syngas exiting scrubber 60 is passed through nitrogen and sulfur adsorbing/absorbing guard beds 64 and 68 to produce a clean syngas in line 70 for use in synthesis or other operations, as in the embodiment described above. However, in this embodiment of the process of the invention, at least a portion of the ammoniated water from line 57 and/or the syngas water in line 61 may be passed into either or both the demister 34 and venturi scrubber 30, with the remainder passed via line 14 back into the humidifier-separator 12, as in the FIG. 1 embodiment. For the sake of convenience only, not all of the recycle lines are shown in the Figure. Indirect heat exchanger 17 cools the clean water produced in 12 before it enters tower 60 and line 77 permits removal of excess clean water from the process. The clean water produced in this embodiment will be similar to that produced in the embodiment described above with respect to the very low levels of residual ammonia and any possible remaining hydrogen cyanide. As is the case for the embodiment disclosed above and shown in FIG. 1, an internal or external reboiler may be associated with tower 12 for generating steam from a portion of the clean water produced in the tower by the stripping action of the hydrocarbon gas feed.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A synthesis gas production and clean-up process which comprises producing a synthesis gas comprising $H_2$, CO, ammonia and hydrogen cyanide in a synthesis gas generator from a feed comprising a hydrocarbon gas, followed by removing said ammonia and hydrogen cyanide from said gas to form a clean synthesis gas by catalytically converting most of said hydrogen cyanide in said synthesis gas to ammonia, removing said ammonia and a portion of said hydrogen cyanide remaining in said synthesis gas after said conversion by cooling said gas to form a condensate comprising a first aqueous solution of said ammonia and hydrogen cyanide and an ammonia reduced synthesis gas, followed by scrubbing said cool gas with clean water to remove additional ammonia and hydrogen cyanide to form both a clean synthesis gas and a second aqueous solution of said ammonia and hydrogen cyanide, combining at least a portion of said aqueous solutions and stripping said ammonia and hydrogen cyanide out of said combined solutions and into said generator with said hydrocarbon feed gas to produce clean water, wherein said stripped ammonia and hydrogen cyanide are consumed in said generator and wherein at least a portion of said clean water is used to scrub said cool gas.

2. A process according to claim 1 wherein sulfur present in said hydrocarbon feed gas is removed prior to said synthesis gas production.

3. A process according to claim 2 wherein a portion of said ammonia and hydrogen cyanide are dissolved out of said synthesis gas prior to said cyanide conversion, to form a pre-conversion aqueous solution of ammonia and hydrogen cyanide and a synthesis gas reduced in said ammonia and hydrogen cyanide.

4. A process according to claim 3 wherein at least a portion of said pre-conversion solution is combined with said first and second solutions in said stripper in which said hydrocarbon gas feed strips out said ammonia and hydrogen cyanide to form said clean water.

5. A process according to claim 4, wherein said hydrogen cyanide is catalyticaly hydrolyzed to ammonia.

6. A process according to claim 4, wherein said pre-conversion aqueous solution is formed by contacting said synthesis gas with water in a high energy contacting means to remove particulate matter from said gas and form water containing said matter, ammonia and hydrogen cyanide and wherein said particulate reduced gas is scrubbed with water which further removes said particulate matter and dissolves more ammonia and hydrogen cyanide out of said gas, and wherein said water resulting from said high energy contacting and said scrubbing are combined to form said first solution.

7. A process according to claim 6 wherein at least a portion of said first solution is used for scrubbing said particulate matter reduced synthesis gas produced in claim 10.

8. A process for producing and cleaning a synthesis gas useful as a feed for a hydrocarbon conversion process comprises the steps of:

(a) removing sulfur from a natural gas to form a hydrocarbon gas feed for a synthesis gas generator;

(b) passing at least a portion of said gas feed through a humidifier in which it contacts an aqueous solution containing ammonia and minor amounts of hydrogen cyanide, to strip said ammonia and cyanide out of said water and form clean water and a humidified gas feed containing ammonia and cyanide;

(c) passing said humidified gas feed containing ammonia and cyanide into said synthesis gas generator to consume said ammonia and cyanide and to form a synthesis gas comprising a mixture of $H_2$ and CO, along with ammonia and hydrogen cyanide;

(d) contacting said synthesis gas comprising said mixture of $H_2$ and CO, ammonia and hydrogen cyanide with a hydrogen cyanide conversion catalyst at conditions effective to convert most of said hydrogen cyanide to ammonia, to form a synthesis gas reduced in hydrogen cyanide and enriched in ammonia and which also contains water vapor;

(e) cooling said synthesis gas reduced in hydrogen cyanide and enriched in ammonia to form an aqueous solution containing said hydrogen cyanide and a portion of said ammonia and a synthesis gas of reduced ammonia and hydrogen cyanide content;

(f) scrubbing said synthesis gas of reduced ammonia and hydrogen cyanide content with said clean water produced in step (b) to form a clean synthesis gas and an aqueous ammonia solution, and (g) passing said aqueous ammonia solution formed in step (f) into said humidifier to humidify said gas feed and produce said clean water.

9. A process according to claim 8 wherein at least a portion of said aqueous solution formed in step (e) is passed into said humidifier.

10. A process according to claim 9 wherein said hydrogen cyanide is converted to said ammonia by catalytic hydrolysis.

11. A process according to claim 10 wherein said catalyst comprises an oxide of at least one metal selected from the group consisting essentially of a Group VI metal, a Group IVB metal and mixture thereof.

12. A process according to claim 11 wherein said hydrocarbon gas feed has a sulfur content less than 0.1 vppm.

13. A process according to claim 11 wherein said clean synthesis gas has a combined ammonia and hydrogen cyanide content of less than 100 vppb.

14. A process according to claim 11 wherein said clean water contains less then 100 mg/L of ammonia.

15. A process according to claim 14 wherein said clean water has a hydrogen cyanide content of less than 0.1 mg/L.

16. A process according to claim 11 wherein said catalyst contains an oxide of Al and at least one of Mo and Ti.

17. A process according to claim wherein said synthesis gas is cooled prior to said hydrolysis to form a condensate comprising an aqueous solution of ammonia and cyanide and a synthesis gas reduced in ammonia and cyanide.

18. A process according to claim 11 wherein at least a portion of said solution formed prior to said hydrolysis is passed into said humidifier.

* * * * *

UNITED STATES PATENT AND TRADEMARK OFFICE
CERTIFICATE OF CORRECTION

PATENT NO. : 5,948,378
DATED : September 7, 1999
INVENTOR(S) : Russell J. Koveal, Dennis G. Alexion It is certified that error appears in the above-identified patent and that said Letters Patent is hereby corrected as shown below:

Title page,
Insert the number "16" after the phrase "A process according to claim" in claim 17 of the above referenced patent.

Signed and Sealed this

Fifth Day of March, 2002

Attest:

JAMES E. ROGAN
Attesting Officer   Director of the United States Patent and Trademark Office